July 15, 1924.
M. M. HADDAD
CANDY MOLD
Filed March 8, 1922
1,501,659
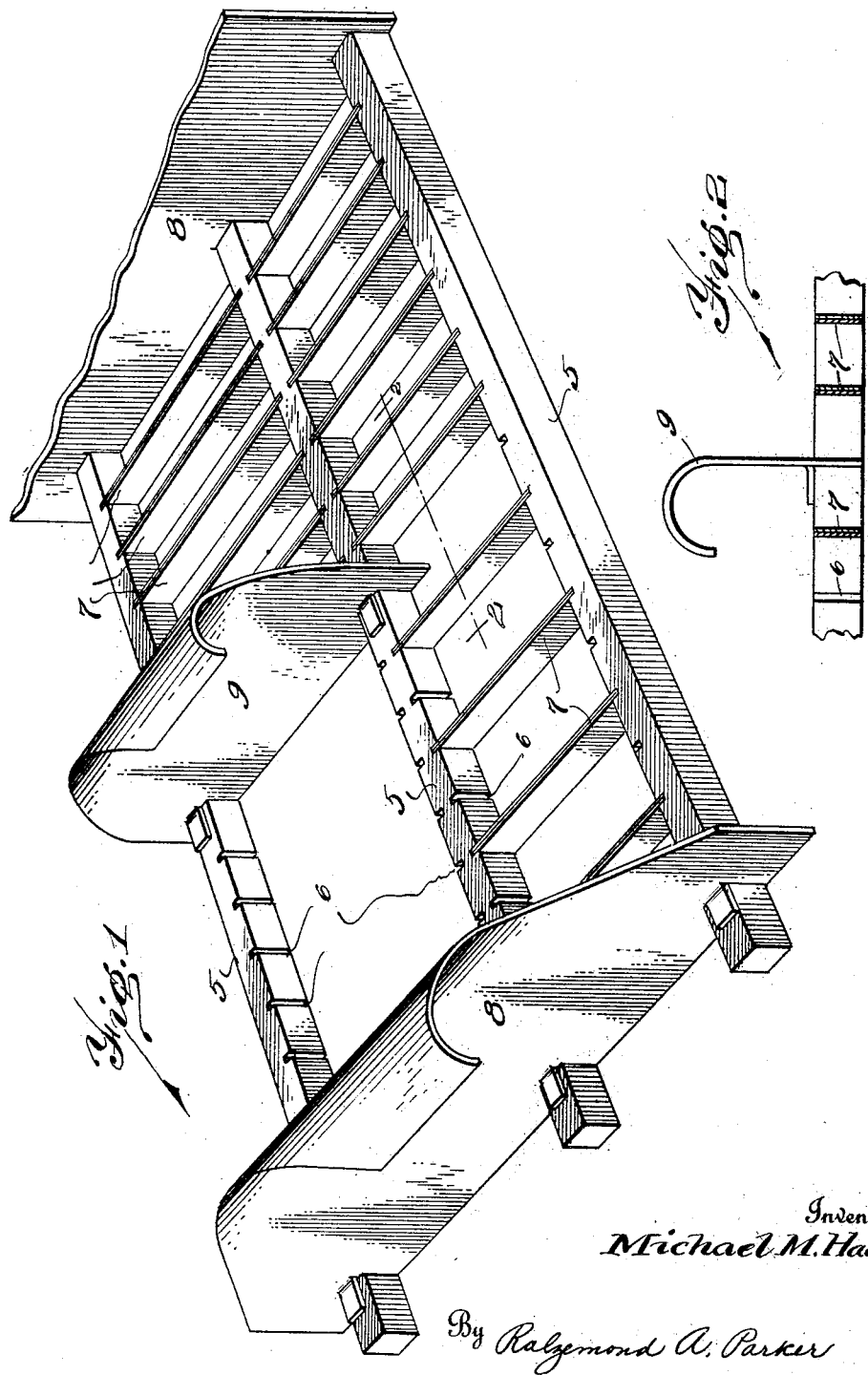
Inventor
Michael M. Haddad
By Ralzemond A. Parker
Attorney Patented July 15, 1924.

1,501,659

UNITED STATES PATENT OFFICE.

MICHAEL M. HADDAD, OF PONTIAC, MICHIGAN.

CANDY MOLD.

Application filed March 8, 1922. Serial No. 541,916.

*To all whom it may concern:*

Be it known that I, MICHAEL M. HADDAD, a citizen of the United States, residing at Pontiac, county of Oakland, State of Michigan, have invented a certain new and useful Improvement in Candy Molds, and declare the following to be a full, clear, and exact description of the same, such as will enable others skilled in the art to which it pertains to make and use the same, reference being had to the accompanying drawings, which form a part of this specification.

My invention relates to improvements in candy molds or moulding frames.

The object is to provide a simple, inexpensive candy mold in which the candy may be moulded into sticks or blocks, and allowed to cool; and after the candy is cooled, the mold may be quickly and easily disassembled and the moulded candy removed.

In the drawings:

Figure 1 is a perspective of my improved mold.

Figure 2 is a cross-sectional view, partly in elevation, taken on line 2—2 of Fig. 1.

My improved candy mold is in the form of a frame which is adapted to be placed upon a moulding slab or board, and is provided with a plurality of compartments into which candy may be poured and allowed to cool.

The mold comprises a plurality of independent side rails or longitudinally extending frame members 5, which are transversely slotted at corresponding intervals as at 6 to receive independent individually removable partition pieces 7. Partition pieces divide the intervening space between the side rails into a plurality of small compartments. I provide clamping devices 8 adapted to hold the frame members in position.

It is obvious that the frame members might be provided in such sizes and number as desired: that a single pair might be used, or three frame members as shown in Fig. 1, or even more if a larger quantity of candy was to be moulded at one operation. Likewise the frame members might be slotted at such intervals as was thought most suitable. The partition pieces would preferably be provided in various lengths. The short partition pieces might well serve in the moulding of blocks of candy, and the long partition pieces in the moulding of candy sticks. If but a small quantity of candy were to be moulded, it would not be necessary to utilize a complete section of the frame, and I have provided a separator member 9 adapted to be inserted between the frame pieces in any of the provided slots, and the remaining portion of the frame might be left vacant. The partition pieces might be inserted in successive slots or in alternative slots or as desired, depending upon the size of the piece of candy which was to be moulded.

I have provided the partition pieces in duplicate. It was found that the candy would stick to both sides of the partition pieces where but one thickness of partition member was used. The double partition piece obviates this difficulty.

What I claim is:

A candy mold comprising a pair of longitudinal side members correspondingly transversely slotted to receive intervening spacer sections, a plurality of pairs of intervening spacer sections interposed between said longitudinal members removably receivable at the ends within the slots in the members to form a succession of independent candy-receiving compartments between said longitudinal members, each individual compartment separated from its adjacent compartments by a separate independent spacer section and end plates notched to be received over the longitudinal side members within a slot thereof to hold said side members in spaced-apart relationship.

In testimony whereof, I sign this specification.

MICHAEL M. HADDAD.